Patented Nov. 14, 1922.

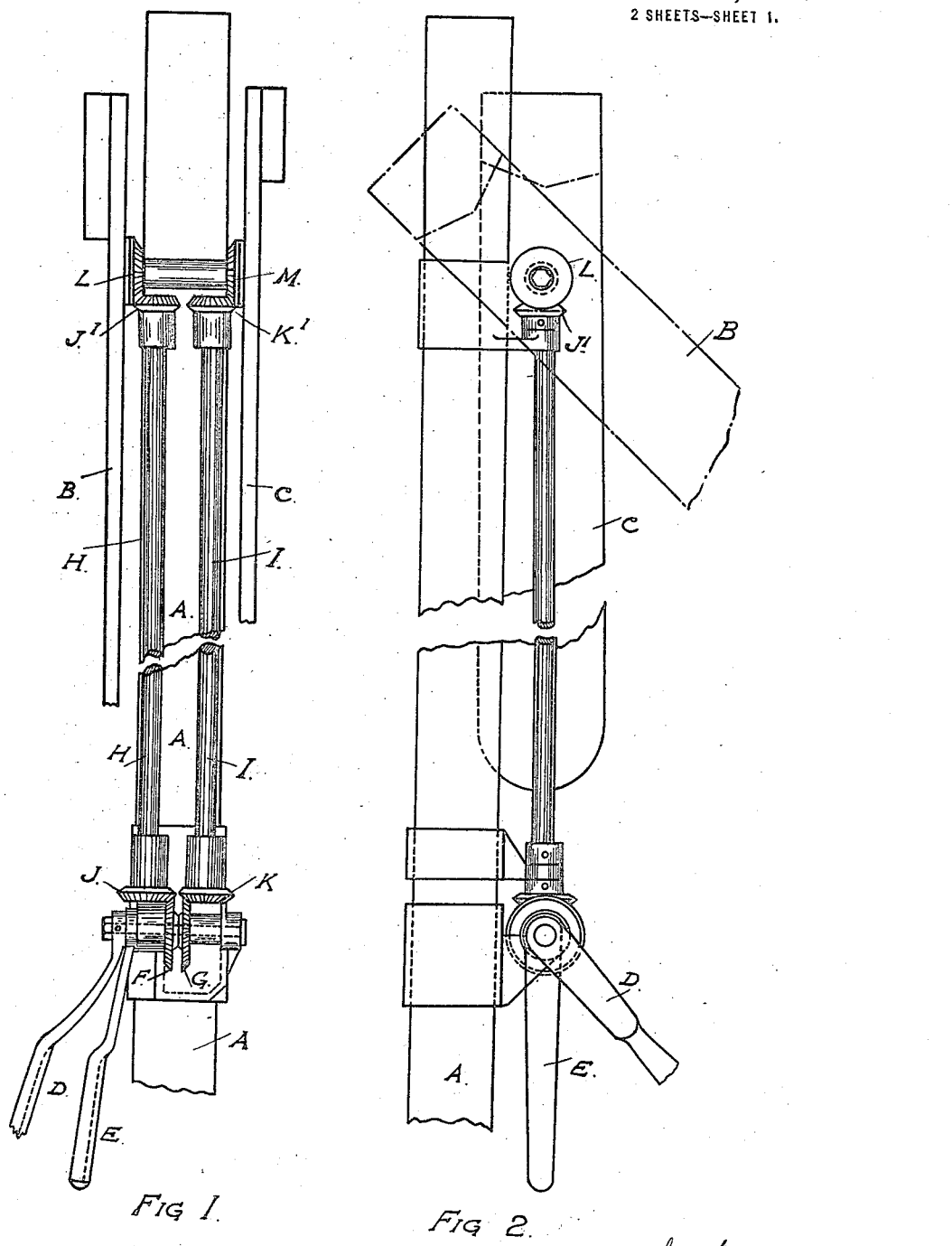

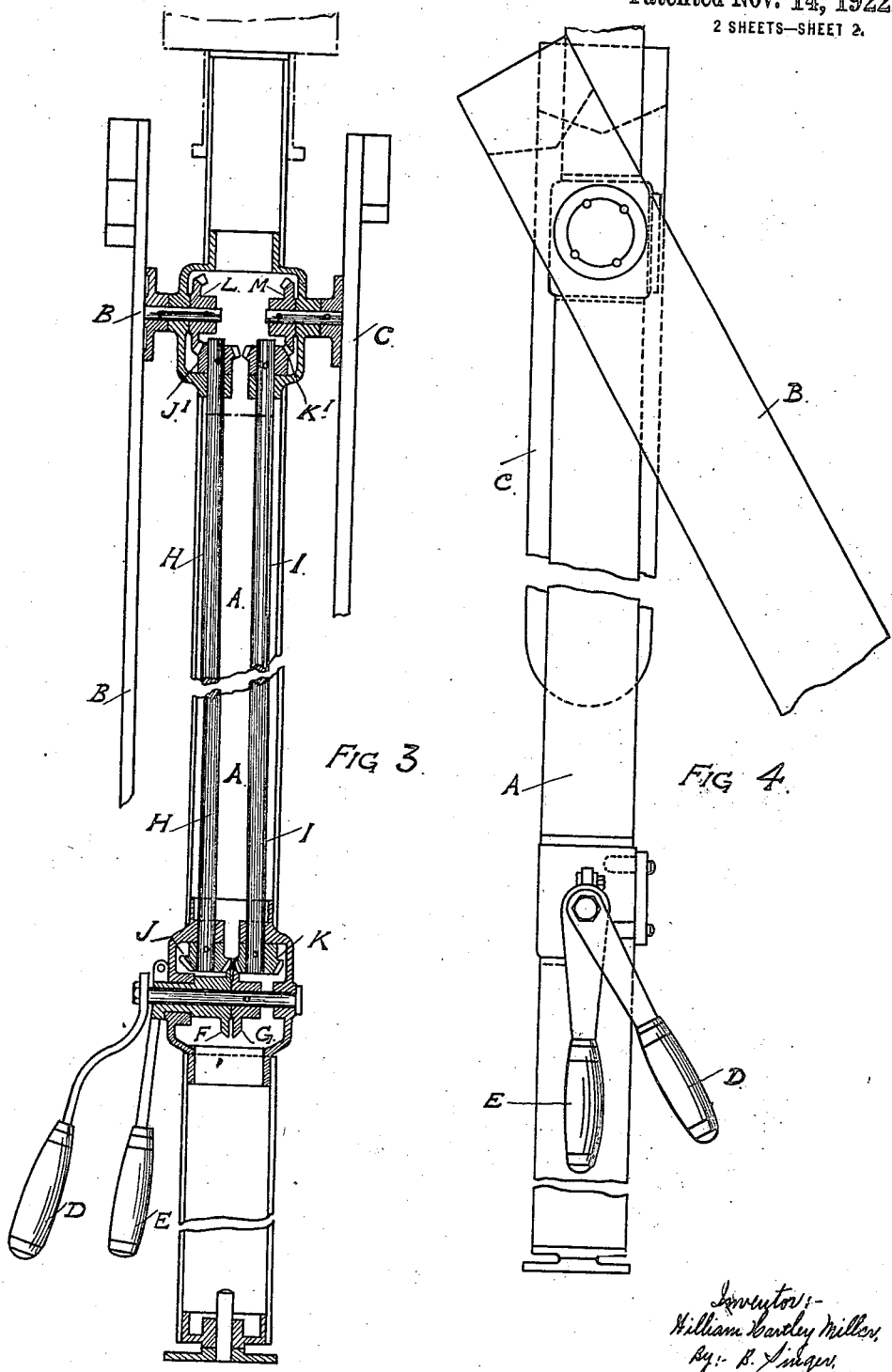

1,435,543

UNITED STATES PATENT OFFICE.

WILLIAM HARTLEY MILLAR, OF GLASGOW, SCOTLAND.

SEMAPHORE SIGNALING APPARATUS.

Application filed April 15, 1919. Serial No. 290,330.

*To all whom it may concern:*

Be it known that I, WILLIAM HARTLEY MILLAR, of 169 Finnieston Street, Glasgow, Scotland, have invented certain new and useful Improvements in and Connected with Semaphore Signaling Apparatus, of which the following is a specification.

This invention relates to improvements in and connected with semaphore signaling apparatus and has for its object to increase its efficiency.

In carrying out my invention, I dispense with the chain and rack and pinion gear heretofore generally employed and in lieu thereof employ bevel gearing operating the semaphore arms by suitable hand lever and connecting rods exterior or interior of the semaphore post so arranged that the lever handles and arms are always free to revolve.

In order that my invention may be properly understood and readily carried into effect, I have hereunto appended two sheets of drawings, of which—

Figure 1 is an elevation of a semaphore made in accordance with and embodying my invention.

Figure 2 is a similar view of the same on a plane at right angles to Fig. 1.

Figure 3 is a vertical section of a semaphore showing a slightly modified construction, and Figure 4 is an elevation of the same taken at an opposite plane all hereafter more fully referred to and described.

Referring to the Figures 1 and 2 of the drawings, A is the semaphore post, B, C, are the two signaling arms, D, E, are the operating handles or levers. The operating handles are each respectively mounted with a bevel wheel F, G, acting independently of each other, a pair of rods H, I, mounted in the direction of the semaphore and exterior thereof, carries each a bevel wheel J, K at the lower end thereof and corresponding bevel wheels J¹, K¹, at the upper end thereof, while a corresponding bevel wheel L, M, is keyed on each upper end thereof of said arms B, C. The signaling arms B, C, are actuated in the signaling operation by the coaction and engagement of the aforesaid bevel gearing in raising and lowering the operating handles or levers the arms B and C being maintained in the same relative position to the post as the lever handles D and E.

Referring to Figures 3 and 4, the mechanical arrangement and operation are the same as in the preceding figures with the exception that the rods H and I and bevel gearing are inserted within the hollow of the semaphore post.

Claims:

In semaphore signaling apparatus, a tubular post comprising a plurality of sections, coupling members connecting the adjacent ends of said sections, and each provided with horizontal bearings and with vertical bearings, signaling arms having pivotal shafts mounted in the horizontal bearings of the upper coupling member and each having a beveled gear on the inner end of its pivot shaft, vertical shafts mounted in said vertical bearings and having beveled gears at their upper ends engaging the first named beveled gears and also having beveled gears at their lower ends, a horizontal shaft mounted in the horizontal bearings of the lower coupling member and having a beveled gear which engages the beveled gear at the end of one of the vertical shafts, a tubular shaft on said horizontal shaft and having a beveled gear which engages the beveled gear at the lower end of the other vertical shaft, and independent operating handles for said horizontal shaft and said tubular shaft, the said coupling members being detachably connected to the tubular post sections and forming housings as well as providing bearings for said shafts and gears.

In testimony whereof I affix my signature in presence of two witnesses.

WILLIAM HARTLEY MILLAR.

Witnesses:
 JOHN LIDDLE,
 JOHN TRAIN LIDDLE.